US006891477B2

(12) United States Patent
Aronstam

(10) Patent No.: US 6,891,477 B2
(45) Date of Patent: May 10, 2005

(54) APPARATUS AND METHODS FOR REMOTE MONITORING OF FLOW CONDUITS

(75) Inventor: Peter Aronstam, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 13 days.

(21) Appl. No.: 10/421,475

(22) Filed: Apr. 23, 2003

(65) Prior Publication Data

US 2004/0212510 A1 Oct. 28, 2004

(51) Int. Cl.[7] .................................................. G08B 21/00

(52) U.S. Cl. .................. 340/606; 340/854.6; 73/152.18

(58) Field of Search ............................. 340/606, 854.3, 340/854.6, 870.01, 870.02, 870.16, 870.18; 73/196, 152.18, 1.16, 1.35, 19.04, 861.05

(56) References Cited

U.S. PATENT DOCUMENTS 3,943,758 A 3/1976 Wolf et al. .............. 73/88.5 R
4,015,194 A 3/1977 Epling ........................... 324/1
4,087,781 A 5/1978 Grossi et al. ................. 340/18
4,119,948 A * 10/1978 Ward et al. ............ 340/870.02
5,149,387 A 9/1992 Moore, Sr. .................. 156/241
5,289,722 A 3/1994 Walker et al. ................ 73/775
5,390,964 A 2/1995 Gray, Jr. ...................... 285/93
5,404,948 A 4/1995 Fletcher ...................... 166/250
5,489,126 A 2/1996 Gray, Jr. ...................... 285/93
5,505,093 A 4/1996 Giedd et al. .................. 73/774
5,553,504 A 9/1996 Lyons et al. .................. 73/799
5,720,342 A 2/1998 Owens et al. ................. 166/57
6,068,394 A 5/2000 Dublin, Jr. .................. 364/508
6,377,203 B1 * 4/2002 Doany ......................... 342/44
6,462,672 B1 10/2002 Besson .................... 340/853.2
6,538,576 B1 * 3/2003 Schultz et al. ........... 340/854.6
2001/0029989 A1 10/2001 Paz ............................ 138/104
2002/0043369 A1 4/2002 Vinegar et al. ........ 166/250.07
2003/0038734 A1 * 2/2003 Hirsch et al. ............ 340/853.1
2003/0098799 A1 5/2003 Zimmerman ............. 340/854.6

FOREIGN PATENT DOCUMENTS

JP S55-44929 * 3/1980 ............. G01F/1/70

OTHER PUBLICATIONS

Cantrell, "Silicon Update: The Dust Flies", http://www.circuitcellar.com/online, (Mar. 2002), 4 pages.

Horton et al., "MICA: The Commercialization of Microsensor Motes", Sensor Technolongy and Design, http://www.sensorsmag.com, (Apr. 2002), [retrieved Mar. 20, 2003], 8 pages.

Fitzgerald, "Not Content to Gather Dust in the Lab, Pioneer Brings Moses to Market", News About MEMS, Nanotechnology and Microsystems, http://www.smalltimes.com, (Feb. 26, 2003), [retrieved Mar. 20, 2003], 3 pages.

* cited by examiner

*Primary Examiner*—Jeffery Hofsass
*Assistant Examiner*—Jennifer A. Stone
(74) *Attorney, Agent, or Firm*—Madan, Mossman & Sriram, P.C.

(57) ABSTRACT

A system for monitoring at least one parameter of interest relating to a flow conduit having a through passage and a fluid flow therein comprises at least one measurement station coupled to the flow conduit for taking a measurement relating to the parameter of interest. An interrogation device is adapted to move proximate the measurement station and to transmit a first signal to the measurement station, and to receive a second signal from the measurement station relating to the parameter of interest. The measurement station receives power from the first signal.

30 Claims, 6 Drawing Sheets

50
45
20
20

APPARATUS AND METHODS FOR REMOTE MONITORING OF FLOW CONDUITS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates to remote monitoring of flow conduits, such as pipelines and wellbores, and more particularly to a system of self-contained measurement stations for measuring parameters of interest of the flow conduit and transmitting the measurements to a mobile interrogation device.

2. Description of the Related Art

Fluid conduits such as pipelines and aqueducts extend for tens, hundreds, or thousands of kilometers and may be used to transport liquids, gases, slurries or combinations thereof. Such conduits may have multiple sections that run above or below ground. Sections may be run underground to avoid natural obstacles such as rivers or simply as a safety precaution. Other sections may be run above ground depending on the topography and underlying strata. Sensing stations are commonly located at major features, such as pumping station that may be separated by tens or hundreds of kilometers. Sensors are used to determine any of a number of parameters of interest related to the operation and safety of the conduit and/or related to the fluid transported therein. However, due to the relatively large separation of these stations, conditions that may be indicative of potential problems or failures may go undetected until they become so great as to cause a catastrophic event, such as for example a substantial leak that may be a serious environmental problem. It would be highly desirable to be able to determine various parameters relating to the physical condition of the conduit including, but not limited to, mechanical strain and stress, crack initiation and propagation, temperature, acceleration and vibration, seismic events, corrosion, pressure integrity, and flowing fluid properties, such as chemical species, radiation, and chemical contamination. The very nature of the length and location of such conduits, however, make the distribution of power and signal lines to multiple measurement stations substantially impractical and cost prohibitive.

There is a demonstrated need for a system for providing more measurements along fluid conduits without the need for additional power and signal lines.

SUMMARY OF THE INVENTION

The present invention contemplates a system for monitoring a flow conduit using remotely interrogated measurement stations disposed along the conduit.

In one preferred embodiment, a system for monitoring at least one parameter of interest relating to a flow conduit having a through passage and a fluid flow therein comprises at least one measurement station coupled to the flow conduit for taking a measurement relating to the parameter of interest. An interrogation device is adapted to move proximate the measurement station and to transmit a first signal to the measurement station, and to receive a second signal from the measurement station relating to the parameter of interest.

In one aspect, a method for monitoring at least one parameter of interest relating to a flow conduit having a fluid flow therein, comprises coupling at least one measurement station to the flow conduit at a predetermined location. The measurement station is adapted to measure the at least one parameter of interest. An interrogation device is passed proximate the at least one measurement station. A first signal is transmitted from the interrogation device to the measurement station, and the measurement station measures the at least one parameter of interest in response thereto. A second signal related to the parameter of interest and transmitted by the measurement station is received at the interrogation device.

In another aspect, a system for determining at least one parameter of interest relating to a flow conduit having a fluid flowing therein, comprises making the flow conduit from a composite material. At least one electrical conductor is embedded along the flow conduit in the composite material, and is adapted to transmit and receive radio frequency signals. A plurality of measurement stations are disposed, spaced apart, along the flow conduit at predetermined locations. Each of the plurality of measurement stations is adapted to receive a first signal transmitted from the at least one electrical conductor and to transmit a second signal in response thereto related to a measurement of the at least one parameter of interest.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals, wherein.

DESCRIPTION OF PREFERRED EMBODIMENTS

Figure 1:
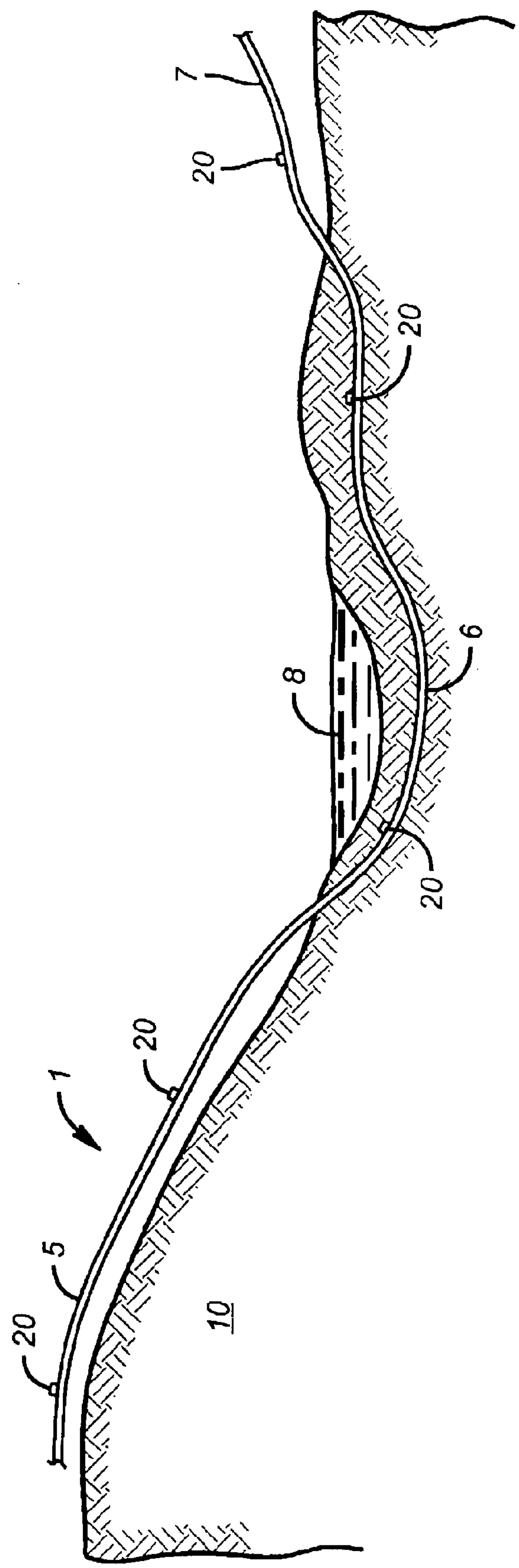
FIG. 1 is a schematic drawing of a fluid conduit traversing an uneven terrain.

In one preferred embodiment, see FIG. 1, a fluid conduit 1 extends across terrain 10. Note that the term fluid conduit as used herein, means a closed conduit, such as a pipeline or other substantially tubular member, and an open conduit such as an aqueduct for transporting liquids such as water. Such conduits may extend for tens, hundreds, or thousands of kilometers and may be used to transport liquids, gases, slurries or other fluids. The conduit 1, for example may be a pipeline having multiple sections 5, 6, 7 that run above or below ground. Sections may be run underground to avoid natural obstacles such as river 8 or simply as a safety precaution. Other sections may be run above ground depending on the topography and underlying strata. Self contained measurement and information stations 20, called measurement stations for simplicity, are disposed along conduit 1 at predetermined locations, to determine any of a number of parameters of interest related to the operation and safety of the conduit and/or related to the fluid transported therein. The greater the number of measurement stations 20, the better will be the confidence that the conduit is operating properly. Various parameters may be measured relating to various physical conditions including, but not limited to, mechanical strain and stress, crack initiation and propagation, temperature, acceleration and vibration, seismic events, corrosion, pressure integrity, and flowing fluid properties, such as flow rate and chemical species, radiation, and chemical contamination. For an open channel, such as an aqueduct, measurement stations 20 may be mounted to determine parameters related to the flow channel such as, for example, seismic events, and/or for determining parameters related to the flowing fluid. Such fluid related parameters, for a water supply flow for example, may relate to chemical analysis and water purity or to contamination by chemical and/or biological agents. The very nature of the length and location of such conduits make the distribution of power and signal lines to multiple measurement stations 20 physically impractical and cost prohibitive.

Figure 2:
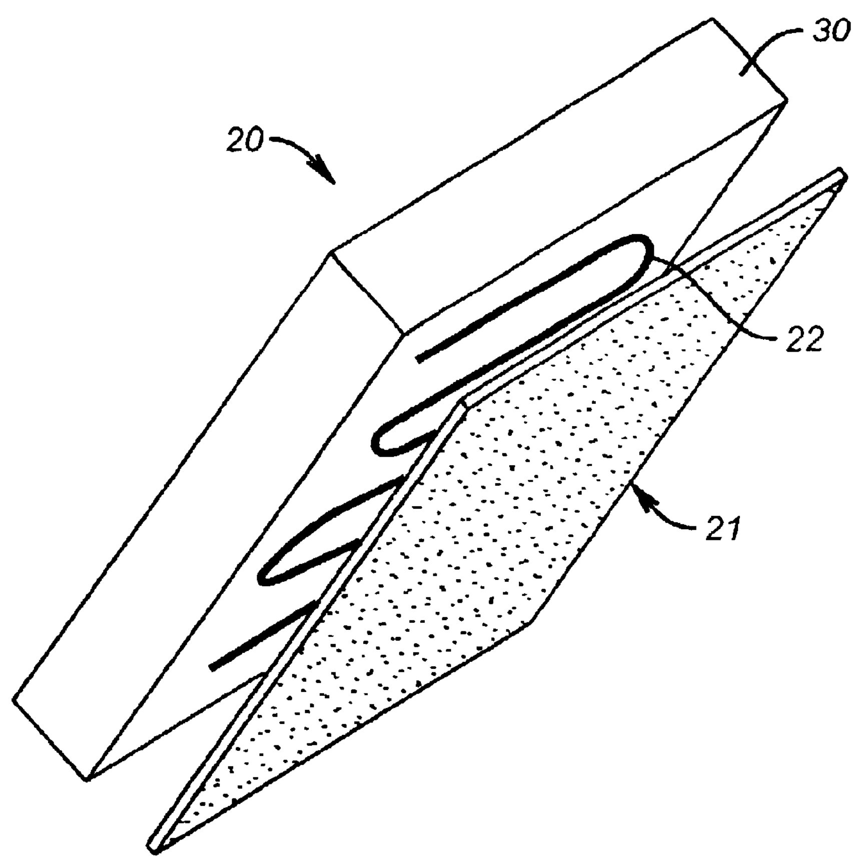
FIG. 2 is a schematic drawing of a self contained measurement and information station according to one embodiment of the present invention.
Figure 3:
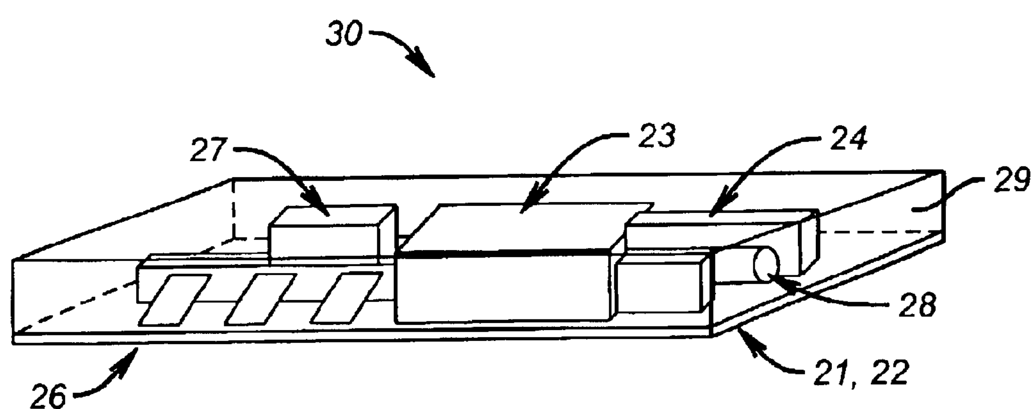
FIG. 3 is a schematic drawing of a measurement module of a self contained measurement and information station according to one embodiment of the present invention.

FIG. 2 shows one preferred embodiment of measurement station 20 having measurement module 30, radio frequency (RF) transmitting and receiving antenna 22, and flexible adhesive base 21 for attaching measurement module 30 to flow conduit 1. In one embodiment, see FIG. 3, measurement module 30 includes at least one sensor 27 for detecting the parameter of interest. Alternatively, sensor 27 may be external to measurement module 30 and suitably electrically connected using techniques known in the art. Interface module 24 conditions the output signal from sensor 27, if necessary, and transfers the signal to data memory in controller module 23. Controller module 23 has a processor with sufficient memory for storing program instructions and for storing acquired sensor measurement data. The controller module may contain a unique identification, such as a digital identifier, for uniquely identifying each measurement station 20 that may be used for correlating the measurements with location on the conduit 1. Also included is RF transceiver 26 for receiving command and power signals and for transmitting data signals in response to the received command signals.

In one preferred embodiment, the measurement module 30 has no internal power source, but receives power via the received RF signal. This power is converted to usable power by power module 28. Sensor 27 is chosen as a low power sensor such that the RF link transmits sufficient power to power measurement module 30 including sensor 27 and to transmit the resulting data signal using RF transceiver 26. The components of measurement module 30 are encapsulated in a suitable compound 29 to protect the components from the environment.

Figure 4:
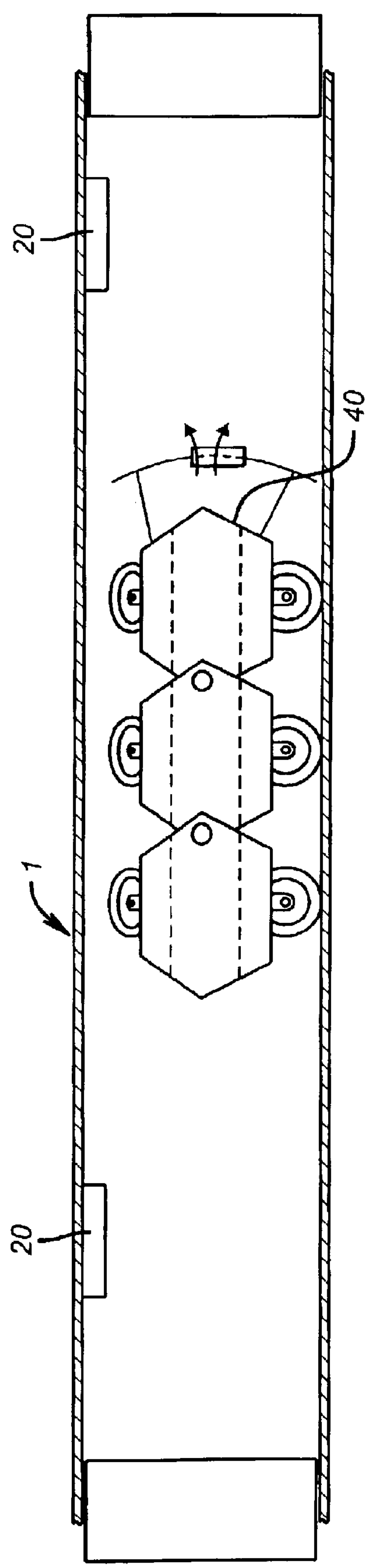
FIG. 4 is a schematic drawing of an articulated conduit inspection pig for use as a mobile interrogation device according to one embodiment of the present invention.
Figure 5:
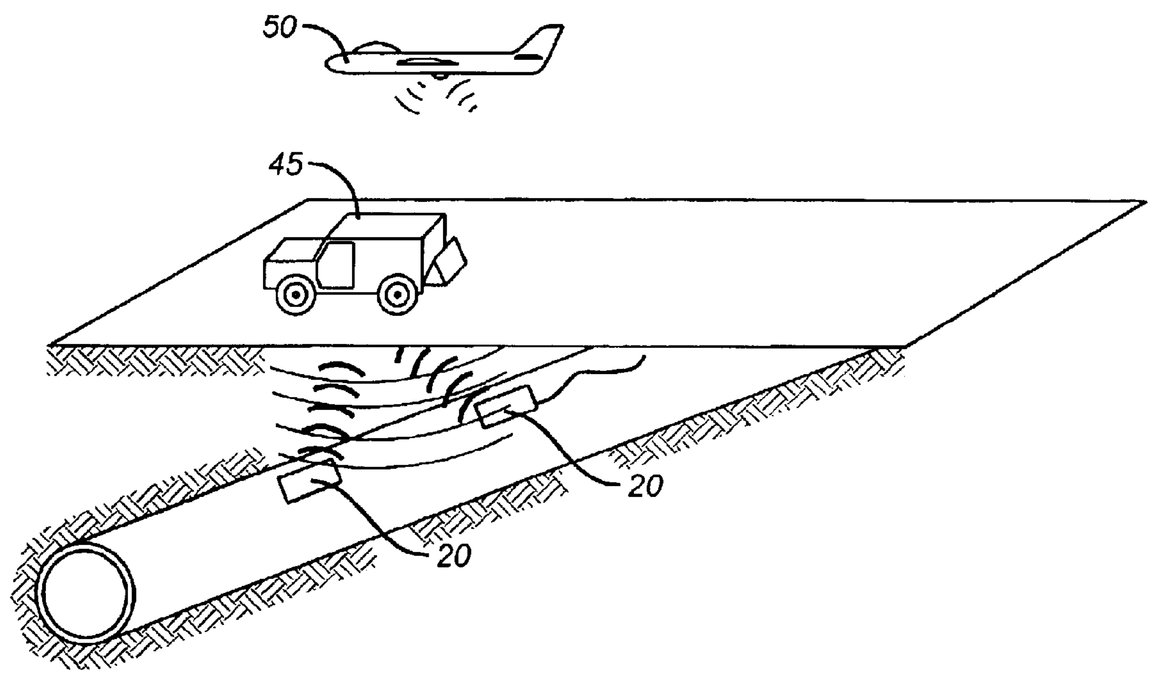
FIG. 5 is a schematic drawing showing an automotive device and an aircraft device for use as mobile interrogation devices according to one embodiment of the present invention.

The RF command signal and RF power are transmitted from, and the data signals received by, a mobile interrogation device (see FIGS. 4 and 5) such as an internal inspection pig 40, an automotive device 45, and an aircraft device 50. Inspection pigs are commonly self-powered for movement in the conduit or, alternatively, may be pumped through flow conduit 1. Any type of inspection pig is suitable for this invention The automotive device 45 may be any common vehicle including, but not limited to an automobile, a truck, and an all-terrain vehicle. The automotive device, is adapted to carry an RF transceiver (not shown) and a controller (not shown) transmitting command signals and power to measurement stations 20 and receiving and storing data signals from measurement stations 20. The aircraft device 50 may be an airplane, helicopter, or any suitable aircraft and may be manned or a remotely controlled, unpiloted aircraft. Remotely controlled aircraft device 50 may be preprogrammed to follow a predetermined flight pattern along the known path of flow conduit 1, using, for example, preprogrammed way points and GPS signals to guide aircraft device 50 along the predetermined flight pattern. Relatively small remotely controlled vehicles are commercially available.

The placement of a particular measurement station 20 at a predetermined location and the type of flow conduit 1 will be used to determine the type of interrogation device used for that particular measurement station 20. For example, the flow conduit 1 may be (i) a tubular conduit of metallic material such as steel, (ii) a tubular conduit out of a non-metallic material such as a composite material, or (iii) an open-channel conduit. For a metallic conduit, the RF energy will not penetrate the conduit. Therefore, a measurement station 20 mounted inside the metallic conduit 1 (see FIG. 4) requires an internal interrogation device such as a pipeline pig 40. A measurement station 20 mounted outside of a metallic conduit 1 (see FIG. 5) requires an external interrogation device such as automotive device 45 and/or aircraft device 50. For a composite material, the conduit 1 is substantially transparent to RF energy and allows the measurement stations 20 to be mounted internally, externally, and/or embedded within the conduit and be able to operate with an internal and/or external interrogation device.

The sensors 27 used to detect the parameters of interest include, but are not limited to, (i) mechanical strain gages, (ii) fiber optic strain gages, (iii) ultrasonic detectors for detecting micro-crack initiation and propagation, (iv) accelerometers, (v) temperature sensors, including distributed fiber optic temperature sensors known in the art, (vi) pressure sensors, (vii) corrosion detectors, (viii) radiation detectors, (ix) spectroscopic chemical detectors, and (x) ultrasonic detectors for measuring the wall thickness of the flow conduit for detecting erosion and/or corrosion of the conduit. The sensors 27 may detect characteristics associated with the conduit and/or the fluid flowing therein. One skilled in the art will recognize that many of the sensors, for example accelerometers and seismic detectors, are currently achievable using Micro Electromechanical Systems (MEMS) fabrication techniques for providing low power consumption devices. Other sensors are available using piezoelectric crystal technology or resonant crystal technology that require very low power consumption. Thermocouple temperature sensors, for example, generate their own electrical signal and do not require external power to operate.

In operation, the measurement stations 20 are disposed along the flow conduit 1. The measurement stations 20 may be both above and below ground along the length of flow conduit 1 depending on the path of conduit 1. An interrogation device is caused to pass in relative proximity to the measurement stations 20. The interrogation device has an RF transceiver for transmitting command signals and power to the measurement stations 20 and for receiving data signals from the measurement stations 20. The data collected is downloaded from the interrogation device, using techniques known in the art, to a central control station (not shown) for monitoring the various parameter data collected.

In another preferred embodiment, measurement module 30 includes an internal power source (not shown) for powering the electronic devices and sensors as required. The internal power source may include, but is not limited to, (i) a commercially packaged battery, (ii) a thick film battery integrally attached to the measurement module, (iii) a piezoelectric power source deriving power from shock and vibration in the proximity of the measurement module, (iv) a solar cell integrated into an external surface of the measurement module, and (v) a thermoelectric generator integrated into the measurement module. All of these power sources are known in the art. Any combination of these sources may be used and their selection is application specific, and may be determined without undue experimentation, by considering such factors as (i) power required for the type of sensors, (ii) transmission strength required of data signals, and (iii) location of measurement station and flow conduit (for example, above ground or below ground).

In another preferred embodiment, the power sources described above are mounted external to the measurement module 30 and connected to the measurement module via connectors and/or cables using techniques known in the art.

In one preferred embodiment, measurement module 30 contains a real time clock for time stamping measurements. A low power seismic detector, for example, may be continuously measuring seismic activity, but the data is only stored and time stamped if the sensed event exceeds a predetermined threshold or alarm criterion. The data is retrieved by the interrogation device and may be used to indicate that more extensive inspection is needed in the area where the seismic event was detected.

Figure 6:
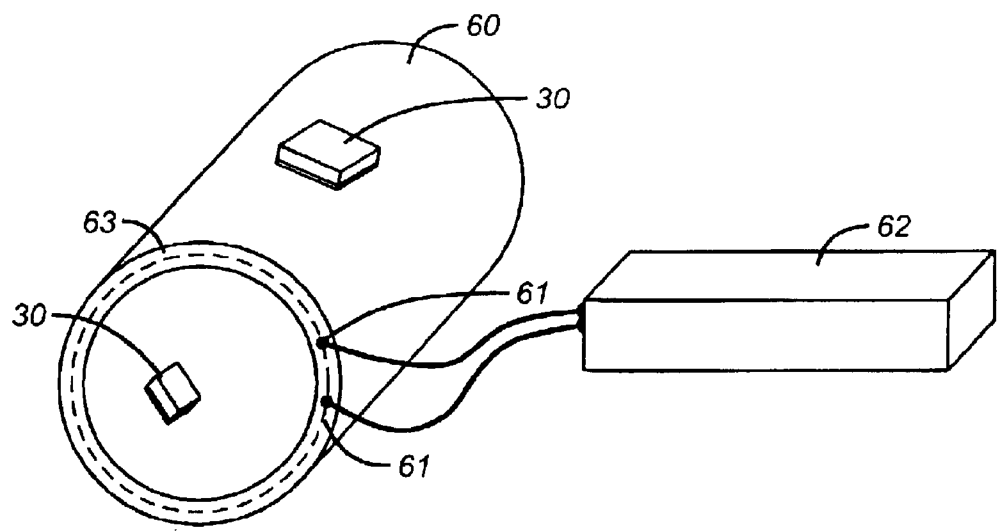
FIG. 6 is a schematic drawing of a composite conduit with embedded conductors for transmitting command signals and/or power to multiple measurement stations according to one embodiment of the present invention.

In one preferred embodiment, shown in FIG. 6, composite fluid conduit 60 has electrical conductors 61 embedded in the wall 63 of fluid conduit 60 during the manufacturing process for forming the conduit. Measurement stations 20 are disposed along the conduit at at least one of (i) on an internal walls of conduit 60, (ii) on an external wall of conduit 60, and (iii) embedded in a wall 63 of conduit 60. The electrical conductors 61 may be disposed substantially longitudinally in the wall of conduit 60. Alternatively, the electrical conductors 61 may be spirally wrapped in the wall of conduit 60. Electrical conductors 60 are connected to RF transceiver (not shown) in a controller 62. Power and command signals are transmitted through the conductors which act as RF antennas. The signals are detected by the measurement modules 30 along the conduit. The measurement stations 20 receive and convert the RF signals to power and command instructions for taking data from sensors in the measurement modules 30. The data are then transmitted via an RF signal that is received by the electrical conductors 61 and decoded by controller 62, according to programmed instructions. The signals from measurement stations 20 are suitably encoded and identified, using techniques known in the art, so as to be able to determine the measurement stations 20 associated with each data signal.

Figure 7:
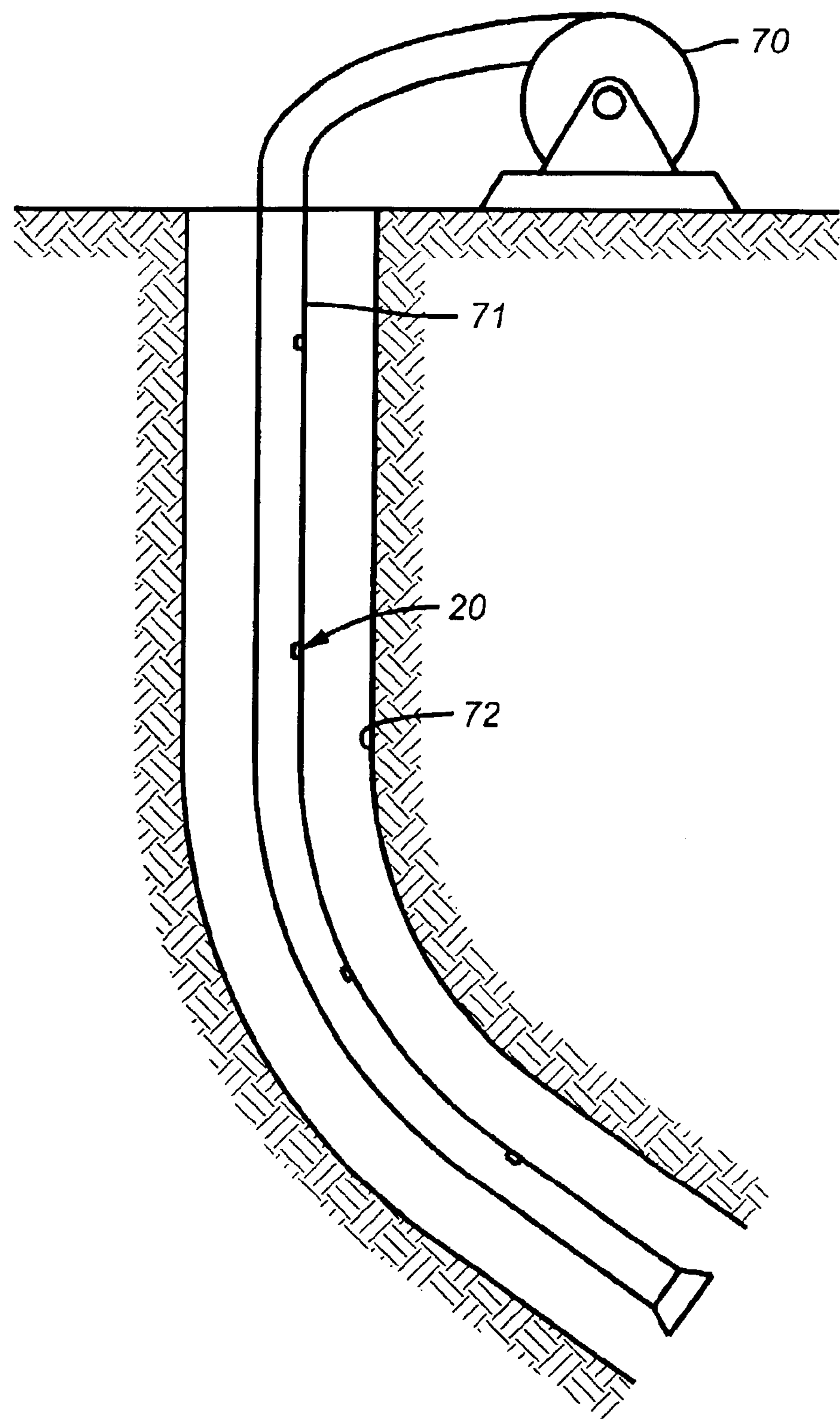
FIG. 7 is a schematic drawing of a coiled composite tubing having embedded conductors and a plurality of self contained measurement and information stations disposed along the tubing according to one embodiment of the present invention.

In one preferred embodiment, see FIG. 7, a composite conduit, as described previously having embedded electrical conductors and internal, external, and/or embedded measurement stations 20, may be formed as a coiled tubing 71, contained on reel 70, for use in drilling and/or completing a wellbore 72. Measurements from measurement modules 30, embedded in the coiled tubing 71, may be used to determine parameters of interest regarding the condition of the tubing string and/or parameters related to the drilling process. Such parameters of interest include, but are not limited to, (i) directional parameters, (ii) drilling induce vibration, including axial and torsional, (iii) weight on bit, (iv) downhole pressure, (v) downhole temperature, and (vi) formation parameters including natural gamma ray emission.

Figure 8:
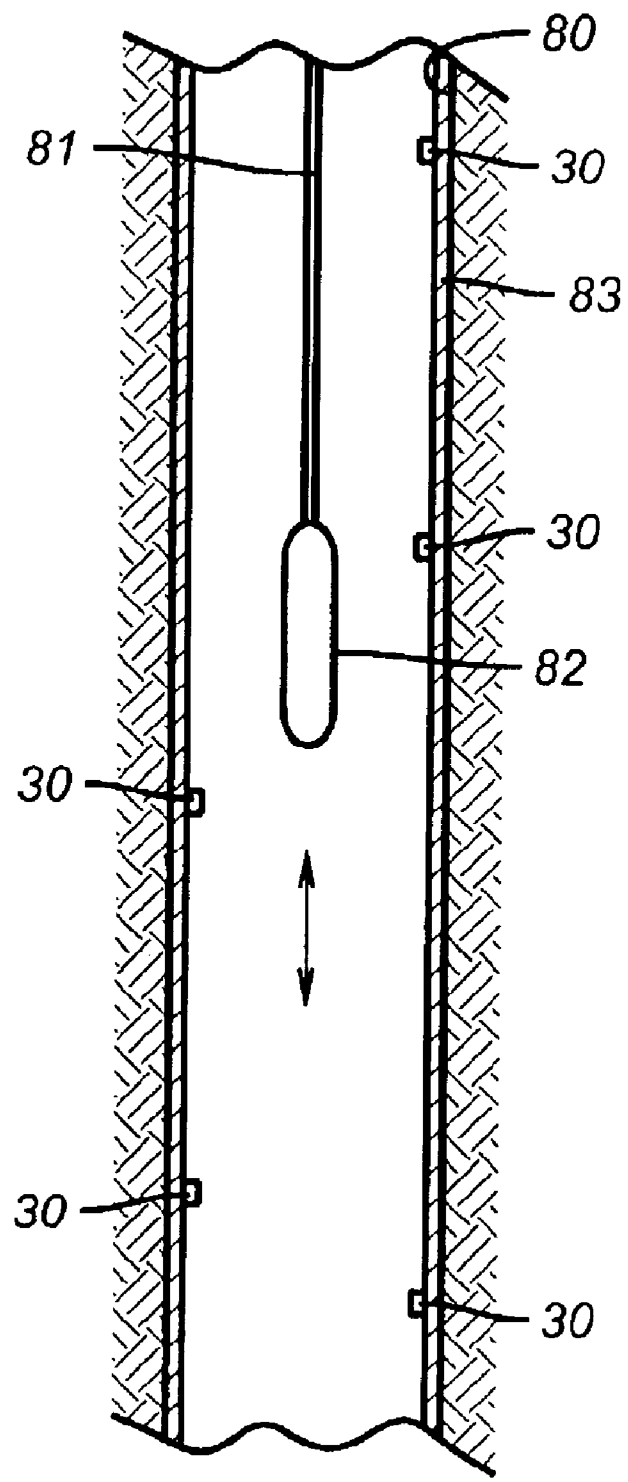
FIG. 8 is a schematic drawing of a casing with a plurality of self contained measurement and information stations disposed along the tubing and an interrogation device deployed on a tubular member according to one embodiment of the present invention.

In one preferred embodiment, see FIG. 8, metallic casing 83 is fixed in place in production wellbore 80. Measurement modules 30 are fixed to an internal surface of casing 83 and measure parameters of interest including, but not limited to, (i) fluid pressure, (ii) fluid temperature, (iii) fluid flow rate, (iv) corrosion, and (v) casing stress. An interrogation device 82 is deployed on wireline 81 and is passed in proximity to measurement modules 30 and has an RF transceiver that transmits RF power and command signals to measurement modules 30, which in turn, make measurements and transmit that data via RF transmission to interrogation device 82. Interrogation device 82 has internal memory for storing the received data and is downloaded at the surface. Alternatively, wireline 81 has electrical conductors and received data is transmitted directly to the surface. The interrogation device 82 may alternatively be deployed on a coiled tubing (not shown) using techniques known in the art.

What is claimed is:

1. A system for monitoring at least one parameter of interest relating to a flow conduit having a through passage and a fluid flow therein comprising:

a) at least one measurement station coupled to said flow conduit for taking a measurement relating to the parameter of interest; and b) an interrogation device adapted to move proximate said measurement station, said interrogation device further adapted to transmit a first signal to said measurement station and to receive a second signal from the measurement station relating to the parameter of interest.

2. The system of claim 1 wherein said measurement station includes a sensor for making a measurement and a device for storing data relating thereto.

3. The system of claim 2 wherein the measurement station includes a power device for supplying power to the measurement station.

4. The system of claim 1 wherein the measurement station is adapted to transmit data relating to the parameter of interest upon receipt of a command signal.

5. The system of claim 1 wherein:

i. the interrogation device sends a command signal to the measurement station; and ii. the measurement station transmits data upon receipt of the command signal.

6. The system of claim 1 wherein the at least one measurement station includes a plurality of measurement stations disposed spaced apart along a length of the flow conduit.

7. The system of claim 6 wherein the plurality of measurement stations includes sensors that provide measurements of at least two different parameters of interest.

8. The system of claim 1 wherein the parameter of interest is selected from a group consisting of (i) corrosion, (ii)

pressure, (iii) temperature, (iv) fluid flow state, (v) vibration, (vi) chemical composition, (vii) mechanical strain, (viii) chemical contamination, (ix) radioactive contamination, (x) biological contamination, and (xi) seismic events.

9. The system according to claim 2, wherein the measurement station receives power from said interrogation device through radio frequency transmission.

10. The system of claim 1 wherein the first signal and the second signal are radio frequency signals.

11. The system of claim 1 wherein the measurement station includes interface circuitry and a processor acting according to programmed instructions.

12. The system of claim 10 wherein the measurement station receives electrical power from said first signal.

13. The system of claim 1 wherein the measurement station includes a real-time clock for time stamping a measurement event.

14. The system of claim 13 wherein said measurement event includes a measurement matching a predetermined criterion.

15. The system of claim 1 wherein the at least one measurement station is coupled to at least one of (i) an outer surface of said flow conduit and (ii) an inner surface of said flow conduit.

16. The system of claim 1 wherein the flow conduit is at least one of (i) a fluid pipeline (ii) a wellbore tubular, and (iii) an aqueduct.

17. The system of claim 16 wherein the wellbore tubular is at least one of (i) a casing and (ii) a production tubing.

18. The system of claim 1 wherein the interrogation device moves in said through passage in said flow conduit.

19. The system of claim 1 wherein the interrogation device moves external to said flow conduit.

20. The system of claim 19 wherein said external interrogation device is as least one of (i) an automotive device and (ii) an aircraft device.

21. The system of claim 1 wherein the flow conduit is made from at least one of (i) a metallic material, (ii) a composite material and (iii) a cementitious material.

22. The system of claim 21, wherein the at least one measurement station is embedded in the flow conduit made of a composite material.

23. The system of claim 22, wherein the flow conduit made of a composite material includes at least one electrical conductor embedded along the length of said flow conduit, said electrical conductor adapted to act as an RF antenna for transmitting and receiving RF signals.

24. The system of claim 1, wherein the measurement station receives power from a power source chosen from the group consisting of (i) a commercially packaged battery, (ii) a thick film battery integrally attached to the measurement station, (iii) a piezoelectric power source deriving power from shock and vibration in the proximity of the measurement station, (iv) a solar cell integrated into an external surface of the measurement station, and (v) a thermoelectric generator integrated into the measurement station.

25. A method for monitoring at least one parameter of interest relating to a flow conduit having a fluid flow therein, comprising;

a) coupling at least one measurement station to said flow conduit at a predetermined location, said measurement station adapted to measure said at least one parameter of interest;

b) passing an interrogation device proximate said at least one measurement station;

c) transmitting a first signal from said interrogation device to said measurement station, said measurement station measuring said at least one parameter of interest in response thereto; and d) receiving a second signal related to said parameter of interest at said interrogation device transmitted by said measurement station.

26. The method of claim 24 wherein the first signal and the second signal are radio frequency signals.

27. The method of claim 26, wherein the at least one measurement station receives power from said first signal.

28. The method of claim 25 wherein measuring at least one parameter of interest includes measuring at least one parameter selected from a group consisting of (i) corrosion, (ii) pressure, (iii) temperature, (iv) fluid flow state, (v) vibration, (vi) chemical composition, (vii) mechanical strain, (viii) chemical contamination, (ix) radioactive contamination, (x) biological contamination, and (xi) seismic events.

29. The method of claim 25 wherein the interrogation device is at least one of (i) an inspection pig, (ii) an automotive device, and (iii) an aircraft device.

30. A system for determining at least one parameter of interest relating to a flow conduit having a fluid flowing therein, comprising:

a) the flow conduit made from a composite material;

b) at least one electrical conductor embedded along said flow conduit in said composite material, said at least one electrical conductor adapted to transmit and receive radio frequency signals; and c) a plurality of measurement stations disposed spaced apart along said flow conduit at predetermined locations, each of said plurality of measurement stations adapted to receive a first signal transmitted from said at least one electrical conductor and to transmit a second signal in response thereto related to a measurement of the at least one parameter of interest.

* * * * *